Figure 1:
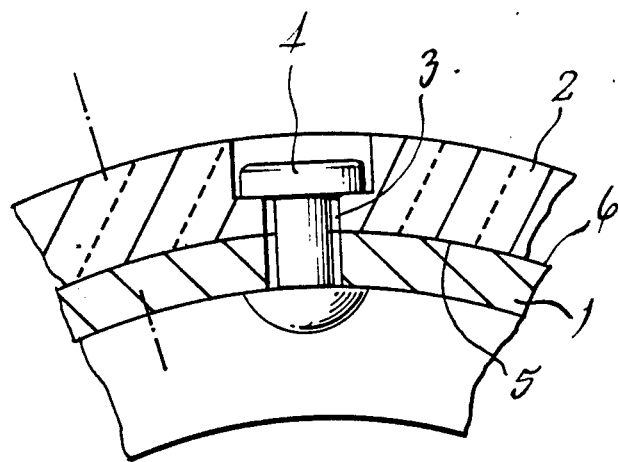

United States Patent [19]

Jonas

[11] Patent Number: 4,694,937
[45] Date of Patent: Sep. 22, 1987

[54] FRICTION ELEMENTS, ESPECIALLY FOR DRUM BRAKES

[75] Inventor: Siegfried Jonas, Gummersbach, Fed. Rep. of Germany

[73] Assignee: Beral Bremsbelag GmbH, Fed. Rep. of Germany

[21] Appl. No.: 834,395

[22] Filed: Feb. 28, 1986

[30] Foreign Application Priority Data

Mar. 7, 1985 [DE] Fed. Rep. of Germany ....... 3508109

[51] Int. Cl.$^4$ ............................................. F16D 69/00
[52] U.S. Cl. ..................................... 188/73.1; 156/92; 156/276; 192/107 M; 188/250 G; 188/251 A; 188/251 M
[58] Field of Search ................. 188/73.1, 73.2, 250 G, 188/250 B, 251 R, 251 A, 251 M; 156/92, 276; 192/107 R, 107 M

[56] References Cited

U.S. PATENT DOCUMENTS 2,581,926  1/1952  Groten et al. .............. 188/250 G X

FOREIGN PATENT DOCUMENTS 7628630  12/1976  Fed. Rep. of Germany .
53-22219   7/1978  Japan .............................. 188/250 G
1436064    5/1976  United Kingdom ........... 188/250 G Primary Examiner—Douglas C. Butler
Attorney, Agent, or Firm—Nixon & Vanderhye

[57] ABSTRACT

A friction element with a riveted friction lining, especially for highly stressed drum brakes, in which the mating surface (5) of the friction lining (2) to the lining carrier (1) and/or the opposing surface (6) of the lining carrier (1) to the friction layer (2) is provided with a multiplicity of particles (7) which are harder than the material of the opposing surface (6) of the lining carrier (1).

11 Claims, 2 Drawing Figures

FRICTION ELEMENTS, ESPECIALLY FOR DRUM BRAKES

This invention relates to a friction element with a rivetted friction layer, especially for highly stressed drum brakes.

With rivetted friction linings, especially with friction linings on brake shoes for drum brakes, the frictional forces acting on the friction lining in the peripheral direction when operating the brakes must be transferred from the lining to the brake shoes. Especially with highly stressed drum brakes, for example in commercial vehicles, operation of the brakes causes heating of the friction lining for example from ambient temperature of 20° C to a temperature, depending on the duration of braking, of 300° to 450° C. After releasing the brakes the friction lining cools to the starting temperature, or, depending on the frequency of operation of the brakes, to an intermediate temperature. The consequence of this is that whilst in service, the friction lining, particularly due to its relatively large length in the direction of the periphery of the brake drum, expands and contracts in the direction of the periphery of the brake drum due to its coefficient of expansion and the rises and falls in temperature. Even though the underlying brake shoe, which is usually made of metal, is similarly exposed to changes in temperature, relative displacements occur between the friction lining and the underlying brake shoe. Thus the friction lining cannot be attached rigidly to the brake shoe, even with rivets, but the transmission of force between the friction lining and the brake shoe must also take place by frictional means. This frictional force is generated by the pressure exerted by each rivet between the friction lining and the brake shoe. Under normal circumstances this frictional force between the friction lining and the brake shoe is considerably greater than the sliding friction between the friction lining and the brake drum. In highly stressed brakes, for example in commercial vehicle brakes, it is possible that in particular at elevated temperature the effective frictional force between the friction lining and the brake shoe can be so reduced when the brakes are operated that it reaches a value which is below the sliding friction value between the brake and the friction lining. When this happens it leads to a movement of the brake lining on the brake shoe in the peripheral direction with the consequence that the rivets are called upon to retain the brake lining in position in the peripheral direction. This leads to stressing of the friction lining in the vicinity of the rivets and also of the rivets, which causes fractures in the friction lining, shearing of the rivets and similar effects.

In order to combat this problem, it has been suggested in DE-GMS 76 28 630 to provide the mating surface between the friction lining and the brake shoe with a thin coating of nitrile latex. It is said that with the aid of this latex coating the friction and adhesion between the brake lining and the brake shoe is increased, so that the frictional force should increase, the harder the lining is pressed against the lining carrier upon operating the brakes. In practice however it has been shown that such thin latex coatings are not sufficiently temperature resistant to solve the problem in highly stressed drum brakes. A similar effect manifests itself with lining carriers for clutches.

The invention has the object of providing a friction element of the previously described type, which exhibits a high frictional hold between the brake lining and the lining carrier even under high loadings, i.e. especially at high temperatures during operation.

Thus according to the invention a friction element comprises a lining carrier and a friction lining rivetted thereon, wherein the mating surface (5) of the friction lining (2) to the lining carrier (1) and/or the opposing surface (6) of the lining carrier (1) to the friction lining (2) is provided with a multiplicity of particles (7) which are harder than the opposing surface (6) of the lining carrier (1).

It is advantageous if both the mating surface of the friction lining and the opposing surface of the lining carrier exhibit a certain degree of surface roughness from manufacture. The particles applied to the mating surface of the lining carrier are then pressed into both surfaces by the compressive force of the rivetted joint, so that in this case a locking force is effected over practically the whole area between the friction lining and the lining carrier. Upon relative displacements between the friction lining and the lining carrier, the particles work in, so that the desired locking force is maintained for the whole life of the friction lining without hindering the relative movement between the friction lining and the lining carrier due to different thermal expansion.

A particular advantage of the invention is that the processing of the lining carrier need not be changed, since the particles are preferably applied to the mating surface of the friction lining. This has the additional advantage that when the friction linings are renewed, a 'fresh' layer of particles is introduced, so that even when the friction lining has been renewed, the originally high frictional locking of the joint is maintained.

In a preferred embodiment of the invention, the particles have a grain size of 0.5–300 micrometers, preferably 1.0–40 micrometers. Such a particle size has the advantage that during the unavoidable movement between the friction lining and the lining carrier, no abrasion can occur which would lead to a reduction in the frictional lock. Particle sizes in the middle to lower region of the given size range have dimensions which are still below the surface roughness depth of both the mating surface of the friction lining and the opposing surface of the lining carrier, so that the surface pressure resulting from the rivetting of the friction lining loads to a strong 'clamping' force between the friction lining and the lining carrier by way of the particles. In a preferred embodiment of the invention the particles consist of grains of abrasive material, for example the particles can be of known abrasive grain compositions, especially of corundum and/or silicon carbide.

In a preferred embodiment of the invention, the particles are bound in a binder layer applied to the mating surface. This has the advantage that the particles can be applied to the corresponding surface of the friction lining and/or the lining carrier using techniques which are known in coating technology. Thus spraying, brushing or roller application can be used, so that the principle of the invention can be applied in mass production.

The binder layer is preferably applied to the mating surface of the friction lining. Application with the aid of a binder layer in the manner of a coating is particularly advantageous for application to friction linings for drum brakes, since here the coating must be applied to a curved surface. In carrying out the invention it is preferred that the binder is an adhesive which is temperature stable at up to 250° C. and which exhibits no thermoplastic properties. This gives fault-free bonding of the particles to the corresponding surface, the choice of adhesive being made on whether the coating formed from a dispersion of particles in the binder is to be applied to the mating surface of the friction lining or to the opposing surface of the lining carrier. It is very important, however, that the binder does not exhibit any thermoplastic properties, since otherwise the friction lining will 'float' on the lining carrier due to softening of the binder at the prevailing high temperatures despite the presence of the sharp edged particles.

The coating may be applied with an application density of 0.001 to 0.06 g cm$^2$, preferably 0.003-0.02 g/cm$^2$, measured on the solids content of the dispersion used. This represents a quite small layer depth, so that after rivetting the particles contained in the binder layer penetrate both into the friction lining and into the lining carrier.

Figure 2:
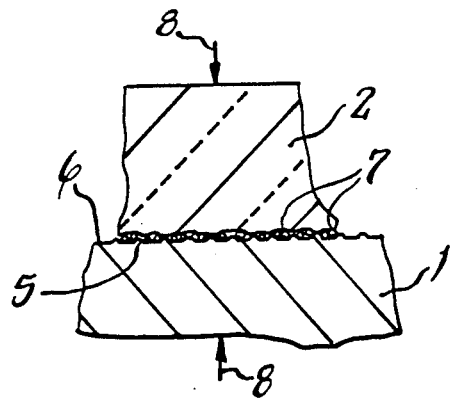

The invention is further illustrated by means of the schematic drawings. These show:

FIG. 1 part of a friction element for a drum brake, partially in section,

FIG. 2 a cross section along the line 11—11 in FIG. 1 at high magnification.

The illustration in FIG. 1 shows a metallic brake shoe (1) for a drum brake, onto which a corresponding curved friction lining (2) is rivetted with several rivets set at a distance from each other.

As shown in the cutaway in FIG. 1, both the brake shoe (1) and the friction lining are provided with holes (3) at the rivetting point. A rivet (4) extends through both holes; the diameter of the rivet being somewhat smaller than the diameter of the hole (3), at least in the part of the hole in the friction lining.

On the mating surface (5) of the friction lining, which is in contact with the opposing surface (6) of the brake shoe is a binder layer in which a granular abrasive material with a particle size in the range 1 to 40 micrometers is bound. This layer can be applied as a coating at an application density of about 0.003 to 0.02 g cm$^2$ measured on the solids content of the applied dispersion.

The binder may, for example, be based on a thermosetting resin such as a phenolic resin, or epoxy resin or on a curable rubber such as nitrile rubber, or on mixtures of such materials.

The highly magnified and simplified illustration in FIG. 2 of the mating surface (5) of the friction lining and the opposing surface (6) of the brake shoe shows that both surfaces exhibit the normal surface roughness associated with processing by turning, grinding, etc. The sharp edged particles (7) consisting of abrasive grains such as for example corundum, silicon carbide, etc, adhere to the mating surface (5) of the friction lining by way of the binder which is not shown. If the two surfaces (5) and (6) are now pressed together under high force in the direction of the arrow (8) by rivetting, the particles (7) distributed over the whole surface are pressed into both the friction lining material and the material of the brake shoe (1). Due to the the high surface pressure at least in a certain area round the rivets, roughness peaks in both materials are pressed flat and at the same time sharp edged particles are pressed into both materials. This gives a practically locked bond between the friction lining and the lining carrier (1) which is not broken by relative movement between the friction lining and the lining carrier (1), nor hinders this. This practically locked bond is also retained if due to different heat expansions the friction lining (2) lifts slightly, i.e. in the micrometer range, from the opposing surface (6) of the brake shoe in a few regions of the whole mating surface due to distortions and the like. The changing relative movements between the friction lining and the brake shoe corresponding to the varying operating conditions do not however render the 'locking' between the friction lining and the lining carrier by way of the particles (7) ineffective, since the particles can work in again over the whole area and grip anew. This is also true for the lining of brand new brake shoes whose opposing surface (6) is coated with a layer of lacquer as a protection against corrosion. Upon rivetting a friction lining carrying a corresponding coating, the sharp edged particles work through the thin lacquer coating due to their high hardness and effect the intended grip between friction lining and brake shoe.

From the foregoing it can be seen that it is preferable to apply the coating to the mating surface (5) of the friction lining since in this way at each lining change the friction coating is also renewed. It is however also possible both for lining of new lining carriers and also upon exchanging worn friction linings, to apply a corresponding particle dispersion to the lining carrier already in use, in the form of a paint. There is the danger in this case however that if a spray were used, spray droplets, drips, etc, of the highly abrasive dispersion could find their way into the mechanical parts of the system and lead to premature wear. It is therefore far preferable to apply the coating of particles to the mating surface (5) of the friction lining. It should be noted that the invention can also be utilised with friction elements for clutches, since here also for example the clutch facing is rivetted and due to its considerable extension in length (in the peripheral direction) as a result of thermal expansion, comparable drawbacks may be encountered.

I claim:

1. A friction element comprising a lining carrier and a friction lining rivated thereon, wherein between the mating surfaces of the friction lining and the lining carrier a multiplicity of particles are provided which particles are harder than the surface of the lining carrier, said particles being adhered to only one of said mating surfaces by means of a binder.

2. A friction element according to claim 1, wherein the particles have a grain size of 0.5 to 300 micrometers, preferably 1.0 to 40 micrometers.

3. A friction element according to claim 2, wherein the particles are grains of an abrasive material.

4. A friction element according to claim 3, wherein the particles are of corundum.

5. A friction element according to claim 3 wherein the particles are of silicon carbide.

6. A friction element according to claim 1 wherein the particles are bonded into a binder layer applied to the surface to which the particles are to be adhered.

7. A friction element according to claim 6, wherein the binder layer contains a binder consisting essentially of an adhesion primer which is stable at temperature up to 250° C. and which exhibits no thermoplastic properties.

8. A friction element according to claim 7 wherein the binder layer has an application density of 0.001 to 0.06 g/cm$^2$, preferably 0.003 to 0.02 g/cm$^2$, measured on the solids content of applied dispersion.

9. A friction element according to claim 8 wherein the binder layer consists of a thermosetting resin, a curable rubber or mixtures thereof.

10. A friction element comprising:

a brake shoe,
a cured friction lining riveted to said brake shoe, and between the mating surfaces of said brake shoe and said lining,
a multiplicity of particles which are harder than the mating surface of the brake shoe, said particles adhered to one of said mating surfaces by a binder layer of an adhesive which is temperature stable to at least 250° C. and exhibits no thermoplastic properties.

11. A friction element according to claim 10 wherein the binder consists essentially of a thermoset polymeric material selected from phenolic resin, epoxy resin and nitrile rubber.

* * * * *